(12) United States Patent
Henderson

(10) Patent No.: US 6,932,173 B2
(45) Date of Patent: Aug. 23, 2005

(54) STEERED VEHICLE

(76) Inventor: Stephen Carl Henderson, Oaklea, Scurragh Lane, Skeeby, Richmond, North Yorkshire DL10 5EG (GB)

(*) Notice: Subject to any disclaimer, the term of this patent is extended or adjusted under 35 U.S.C. 154(b) by 176 days.

(21) Appl. No.: 10/312,677
(22) PCT Filed: Jul. 3, 2001
(86) PCT No.: PCT/GB01/02970
§ 371 (c)(1), (2), (4) Date: Dec. 16, 2002
(87) PCT Pub. No.: WO02/06110
PCT Pub. Date: Jan. 24, 2002

(65) Prior Publication Data
US 2003/0168825 A1 Sep. 11, 2003

(30) Foreign Application Priority Data
Jul. 13, 2000 (GB) .............................. 0017167

(51) Int. Cl.[7] .............................. B61C 11/00; B62D 5/00
(52) U.S. Cl. .................. 180/24.01; 180/449; 280/81.1; 105/72.2
(58) Field of Search .............................. 180/24.01, 209, 180/449; 280/402, 403, 43, 81.1, 81.5, 81.6, 432; 105/72.2, 166, 168, 215.2

(56) References Cited

U.S. PATENT DOCUMENTS

| 1,599,152 | A | * | 9/1926 | Warhus ...................... 280/81.5 |
|---|---|---|---|---|
| 1,838,837 | A | * | 12/1931 | Wouter ...................... 280/81.5 |
| 2,176,170 | A | * | 10/1939 | Fort ............................ 180/23 |
| 3,263,626 | A | * | 8/1966 | Grove et al. ................ 105/72.2 |
| 3,522,956 | A | * | 8/1970 | Rollfinke et al. .......... 280/81.1 |
| 3,589,302 | A | * | 6/1971 | Usami ........................ 104/291 |
| 3,724,584 | A | | 4/1973 | Varichon |
| 3,903,979 | A | | 9/1975 | Perrotin |
| 4,048,925 | A | * | 9/1977 | Storm ........................ 105/72.2 |
| 4,120,509 | A | * | 10/1978 | Reeve et al. ............... 280/81.6 |
| 4,286,798 | A | | 9/1981 | Butler |
| 5,009,169 | A | * | 4/1991 | Viens ......................... 105/4.1 |
| 5,167,190 | A | * | 12/1992 | Galand .................... 105/215.2 |
| 5,429,056 | A | * | 7/1995 | Pees et al. .................. 105/168 |
| 5,730,064 | A | | 3/1998 | Bishop |
| 5,734,336 | A | * | 3/1998 | Smithline ................... 340/903 |
| 5,802,980 | A | | 9/1998 | Hofmiller |
| 5,909,711 | A | | 6/1999 | Vogel et al. |
| 6,324,993 | B1 | * | 12/2001 | Jacob ........................ 105/72.2 |

FOREIGN PATENT DOCUMENTS

| DE | 3427723 A1 | * | 2/1986 | ............. B61F/5/38 |
|---|---|---|---|---|
| EP | 365489 A2 | * | 4/1990 | ............. B61F/5/44 |
| EP | 0870664 A2 | | 10/1998 | |
| GB | 0301777 | | 12/1928 | |
| GB | 1095661 | | 12/1967 | |
| GB | 2328658 A | | 3/1999 | |
| WO | WO 83/02758 A | | 8/1983 | |
| WO | WO 98/03387 A | | 1/1998 | |
| WO | WO 98/46468 A | | 10/1998 | |

* cited by examiner

Primary Examiner—Paul N. Dickson
Assistant Examiner—Laura B Rosenberg
(74) Attorney, Agent, or Firm—Rodman & Rodman

(57) ABSTRACT

The steered vehicle, which may be a road vehicle or a vehicle devised to be usable upon road surfaces and also upon a rail line, has road wheels or a combination of road and rail wheels as required. The wheels are mounted upon a bogie pivoted about a generally vertical pivot and the vehicle has a main steering control to align at least some of the wheels with the intended direction of travel of the bogie, and a supplementary steering control to modify the steered path produced by that main steering control.

13 Claims, 1 Drawing Sheet

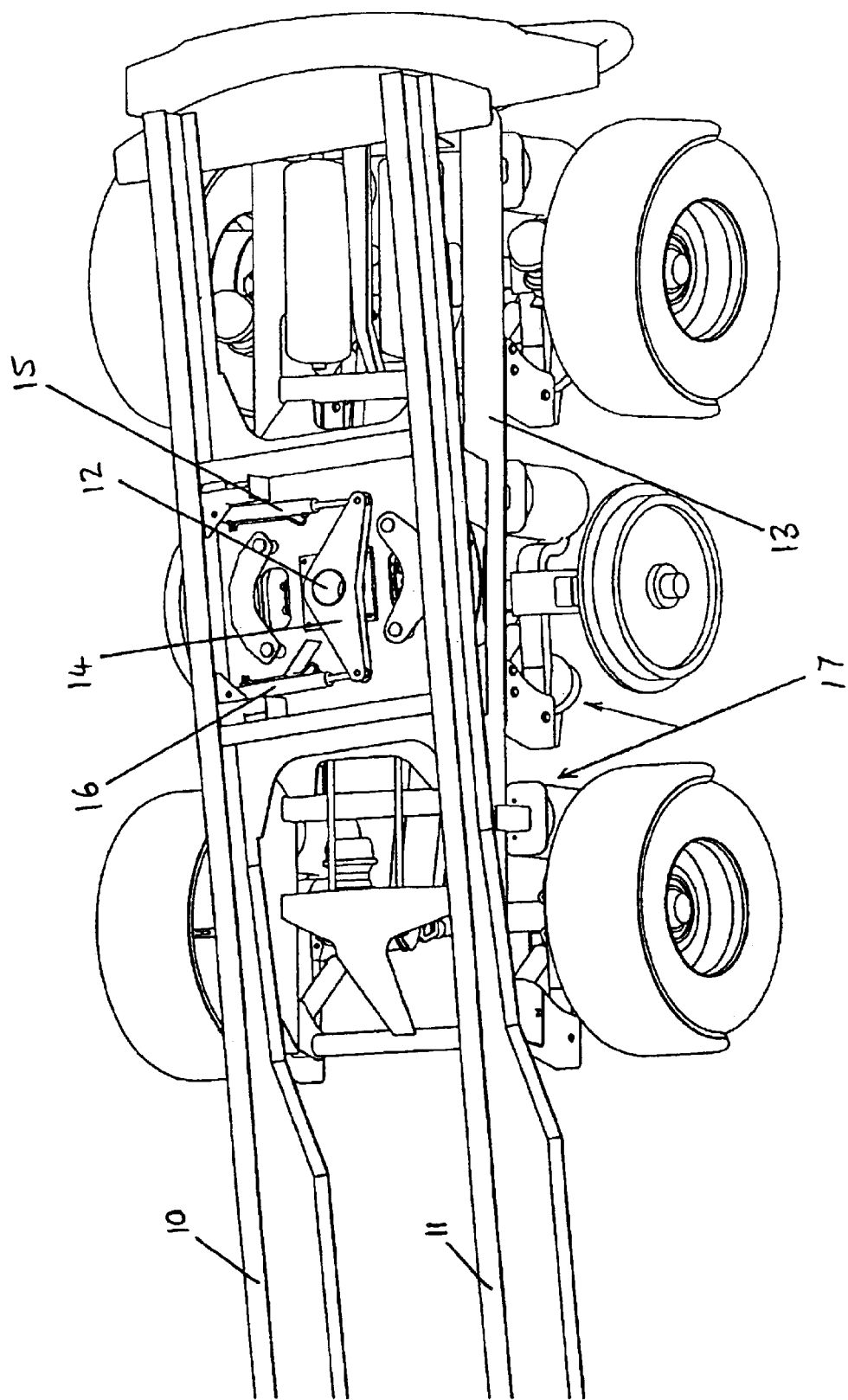

STEERED VEHICLE

BACKGROUND OF THE INVENTION

The present invention is an improved steered vehicle, which vehicle be a road vehicle or a vehicle devised to be used both upon road surfaces and also upon a rail line.

Commercial vehicles designed for use upon public roads, quite apart from any actual or potential conflict with cars and other vehicles intended for roadway use, have the major disadvantage of limited manoeuvrability. Transport costs require that such vehicles carry as large a load as possible but, as such vehicles become longer and/or heavier in their design, their ability to cope with existing roadways is diminished. The load may be better distributed by the use of articulated or unarticulated vehicles, including bogies and bogie-trailer combinations, and any resulting increase in vehicle length does not inevitably require more lateral roadway space if a steered bogie is fitted. However current regulations do not reflect these potential design benefits and the legally permitted maximum vehicle length remains restricted. In this situation, only the cheaper fixed axle systems are commercially viable.

Railway transport systems may take much longer vehicles, that is engines and coaches articulated together, and also of course do not impede road vehicle users. However they rely upon installed railway lines, junctions and sidings, which therefore currently make load transport possible only between predetermined locations.

A combined use of road and rail transport currently requires a transfer of the load from one such form of transport to the other, which inevitably entails a delay and also additional costs. There would be very real merit in a vehicle which is itself able to run both on road and rail but of course the transition of that vehicle from a roadway to a rail line entails both a difficult manoeuvre of alignment of the vehicle body and also the critical engagement of rail wheels with the latter line.

Thus road vehicles as such and rail vehicles both have their disadvantages and limitations but a combined road/rail vehicle, while therefore being a desirable aim, introduces very serious problems of itself for resolution. The present invention offers the possibility of overcoming at least some of these various difficulties.

SUMMARY OF THE INVENTION

The vehicle according to the present invention, which may have road wheels or a combination of road and rail wheels, has such wheels mounted upon a bogie pivoted about a generally vertical pivot, a main steering control to align at least some of the wheels with the intended direction of travel of the bogie, and a supplementary steering control whereby to modify the steered path produced by said main control.

Thus the vehicle is provided with its main means of guiding it and its load from its original loading point to its required destination in the form of its main steering control. However the path of the wheels may be modified for various purposes by the supplementary steering control. By way of example, when the vehicle is primarily a road vehicle, especially a long road vehicle, negotiating a bend, the natural tracking of the rear wheels may be modified, for example to encourage those wheels to follow more closely the line followed by the forward end of the vehicle, in particular when the vehicle is an articulated one. In another such situation, if the road vehicle is negotiating two or more road bends curved in opposite directions, the wheels on the bogie may be directed in an opposite way to those of a towing vehicle, to reduce the overall width of the path taken by the vehicle and trailer together. In yet another situation, the supplementary steering control may be relied upon to modify the wheel alignment by a small amount in order to counter or compensate for transverse influences on the vehicle such as may arise from cross winds or lateral road slope.

In the case of a road-rail vehicle, similar transverse influences on the vehicle may be countered or compensated for in this way.

The present invention is of particular advantageous merit when applied to vehicles which are designed and intended for use upon both road and railway in turn. In particular, when a vehicle having both road wheels and rail wheels is required to leave the roadway and mount the rails, it is vital that each set of rail wheels be precisely aligned with the rail track as the vehicle mounts the rails; otherwise the rail wheels, or the rails themselves and/or the adjacent pavement, may be seriously damaged.

When the vehicle is a combined road and rail vehicle of this latter type, it is particularly preferred that one or other of the two types of wheels, preferably the road wheels, are vertically movable relative to the vehicle, by for example, a known axle lift/suspension system 17 to enable the rail wheels to engage the rails or to withdraw from such engagement, as the vehicle moves to rail transport or road transport mode respectively.

The main steering control may be of any type, or combination of types, conventionally used for enabling the wheels of the vehicle to follow the desired path. Thus most usually the primary steering of the vehicle according to the present invention will be provided by means of hydraulic cylinders or by mechanical means. In the case of a combined road and rail vehicle, the rail wheels are to a significant extent influenced by their cross-sectional shape, that is their inclined peripheral surfaces and the associated flanges. The main steering input to the rear axles of a road vehicle is primarily aimed at encouraging the rear wheels to follow as closely as circumstances require the path of the forward wheels. However for longer vehicles this is particularly difficult to achieve. It is also particularly difficult to rely solely upon the conventional method in the case of rail vehicles.

Thus, in the case of rail vehicles, it is now usual to provide relatively short self-steering bogies having say four or six wheels, with two such bogies supporting a long carriage.

The vehicle according to the present invention, which either may be one designed specifically for road use or may be a road-rail vehicle with wheels of both required types, is characterised by the provision of a supplementary steering control which makes it possible to modify the steered path produced by the main steering system. Thus the vehicle is primarily steered by the latter main system and the supplementary steering control may be relied upon primarily to apply a corrective yaw moment on the bogie to divert the wheels slightly from the main steered path. In this way, a corrective moment may be applied, for example, on sections of road or rail where changes in curvature occur.

External influences, such as side winds, forces arising from driving or braking, and forces attributable to poor linkage adjustment, may also affect the path that the main steering control would otherwise set. The supplementary steering control which characterises the vehicle according to the present invention may function to compensate for the effects of all of these influences and ensure that the vehicle wheels follow the desired path with an enhanced degree of accuracy.

The pivoting of the bogie by the supplementary steering control may be achieved by means, for example, of hydraulic, pneumatic or electromagnetic actuators. Among these specified options, hydraulic actuators are preferred. The position of each actuator may be adjusted by means of gear wheels, cables or direct mechanical linkages. It may further be preferred to locate each actuator at a distance from the point of application of the pivoting force in this way. Such distancing of the actuator may enable the adoption of non-linear force characteristics and scaling of the force arising.

Preferably this supplementary pivoting of the bogie is effected by means of two or four opposing hydraulic cylinders, with hydraulic fluid able to flow readily between them to permit the bogie to pivot freely. The flow of the fluid may be controlled, that is forced, restricted or even stopped, by means of valves, whereby to pivot the bogie in a selected direction or to lock it in one position. In response to the enforced pivotal effect, the tyres or rail wheels will resist the addition of the resulting yaw moment and additional vehicle drag will arise as a result. The amount and duration of the yaw moment may indicate the rate of wear of a tyre and/or the efficiency of the driven vehicle, thus giving a warning of the current condition of the vehicle or of the rail track.

The supplementary pivoting of the vehicle may be controlled by the vehicle driver steering the bogie by means of a joystick, preferably a small one, in the cab of the vehicle. However it is much preferred to control the position of the bogie by means of some form of guide, to which the vehicle may respond by means of an array of sensors, positioned for example in front of the bogie to be steered.

By way of example, an array of sensors for this purpose may be used to detect the position of the rail lines. An alternative form of such a guide may be a line, for example a white such line, painted upon the ground or it may take the form of a magnetic strip or line of guide pins. As yet another possibility, in the light of current improvements in global positioning systems and with local signal refinement, such as is used currently for surveying purposes, the desired orientation of the bogie may be communicated either directly from roadside beacons or between vehicles in a line of sight manner. When the bogie is not aligned accurately with the guide as desired, a positional error signal will be used to control the size and direction of the correctional yaw moment applied to the bogie.

The conditions of the surrounding environment and of the vehicle itself may be taken into account in the application of the correctional yaw moment. For example, if the moment applied to the bogie is limited rather than simply correcting the bogie angle as such, tyre wear may be reduced when the vehicle is on the road. However, when the vehicle is on rail, the bogie angle is preferably guided in such a way that the rail wheels do not move up on to their flanges, so that the wear of the track and of the wheel may in this way be minimised.

If desired, a second set of sensors may be disposed just behind each bogie, for example to assist the reversal of the vehicle into a loading bay, for example by following a painted guide line.

DESCRIPTION OF THE DRAWING

The invention will now be further described, by way of example only, with reference to the accompanying drawing, which illustrates one preferred form of the supplementary steering control of an improved steered vehicle according to the present invention.

DETAILED DESCRIPTION OF THE INVENTION

In the drawing, only the rearward ends of the longitudinal members 10, 11 of the trailer of an articulated vehicle are shown. The trailer is pivotally mounted about a vertical pivot at 12 upon the chassis 13 of a six-wheeled bogie which is steered by a direct linkage to the underside of the trailer. In the absence of the present invention, the trailer would be steered solely in response to rotation of the chassis 13 about the pivot 12 by the towing vehicle.

However, as described in the foregoing general description, there are numerous situations wherein it may be advantageous to modify the steering of the trailer independently of the towing action. To this end, supplementary control of that steering is afforded in this specific example by the illustrated additional device. A symmetrical lever member 14 is secured to the upper end of the pivot 12 and is rotated with the pivot 12, when required, by a pair of matching pistons 15, 16. Thus the main steering action of the illustrated bogie, effected by the main steering link from the main cab of the vehicle itself, may be modified in this way in response to operation of the pistons 15, 16 rotating the lever member 14. The ports of the cylinders of the pistons 15,16 are selectively each opened to a tank in which the hydraulic fluid is stored, so that pressure arising from the piston currently retracting may be released. The addition of a cross-line pressure relief may ensure that the tyres on the pivoted bogie are not unduly scrubbed on the relevant road or rail surface. Free floating of the bogie may be achieved by cross-linking all of the fluid outlet ports—or alternatively by diverting the link lines.

What is claimed is:

1. An improved steered vehicle, having road wheels or a combination of road and rail wheels, said wheels being mounted upon a bogie pivoted about a generally vertical pivot, a main steering control to align at least some of the wheels with an intended direction of travel of the bogie thereby producing a steered path, and a supplementary steering control that applies a yaw movement on the bogie to independently modify the steered path produced by said main control.

2. A steered vehicle as claimed in claim 1, having both road wheels and rail wheels, wherein one or other of those two types of wheels are vertically movable relative to the bogie.

3. A steered vehicle as claimed in claim 1, wherein the main steering control is provided by means of hydraulic cylinders.

4. A steered vehicle as claimed in claim 1, wherein the main steering control is provided by a self-steering bogie.

5. A steered vehicle as claimed in claim 1, wherein the pivoting of the bogie by the supplementary steering control is achieved by means of actuators selected from the group consisting of hydraulic, pneumatic and electromagnetic actuators.

6. A steered vehicle as claimed in claim 5, wherein said hydraulic actuators comprise opposing hydraulic cylinders, with hydraulic fluid able to flow between them.

7. A steered vehicle as claimed in claim 6, wherein the flow of said hydraulic fluid between said cylinders is controlled by valves, to pivot the bogie in a selected direction or to lock it in one position.

8. A steered vehicle as claimed in claim 1, wherein said supplementary steering is controlled by the vehicle driver.

9. A steered vehicle as claimed in claim 1, wherein said supplementary steering is controlled by means of an array of sensors.

10. A steered vehicle as claimed in claim 9, wherein the sensors detect the position of rail lines.

11. A steered vehicle as claimed in claim 9, wherein the sensors detect the position of a guide line.

12. A steered vehicle as claimed in claim 1, wherein the extent of the modification produced by the supplementary steering control is limited.

13. A steered vehicle as claimed in claim 1, wherein additional sensors are disposed behind said bogie, to assist reversal of the vehicle.

* * * * *